US007948913B1

(12) United States Patent
Dinan

(10) Patent No.: US 7,948,913 B1
(45) Date of Patent: May 24, 2011

(54) COMMUNICATING DATA IN VARIOUS MODES USING HEADER-COMPRESSION ALGORITHMS

(75) Inventor: Esmail Hejazi Dinan, Herndon, VA (US)

(73) Assignee: Clear Wireless LLC, Kirkland, WA (US)

( * ) Notice: Subject to any disclaimer, the term of this patent is extended or adjusted under 35 U.S.C. 154(b) by 190 days.

(21) Appl. No.: 12/261,794

(22) Filed: Oct. 30, 2008

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................................................ 370/252

(58) Field of Classification Search .................. 370/477, 370/395.42, 389, 392
See application file for complete search history.

(56) References Cited

U.S. PATENT DOCUMENTS

2004/0073711 A1* 4/2004 Pelletier et al. ............... 709/247
2006/0188004 A1* 8/2006 Kizu et al. .................... 375/132
2007/0097987 A1* 5/2007 Rey et al. ................ 370/395.52
2007/0195764 A1* 8/2007 Liu et al. ...................... 370/389
2008/0080559 A1* 4/2008 Singh ........................... 370/477
2009/0274107 A1* 11/2009 Park et al. ..................... 370/329

OTHER PUBLICATIONS

C. Borman et al., IETF RFC 3095 "Robust Header Compression (ROHC): Framework and four profiles: RTP, UDP, ESP, and uncompressed", Jul. 2001, pp. 1-157.*

C. Bormann, et al., RObust Header Compression (ROHC): Framework and Four Profiles: RTP, UDP, ESP and Uncompressed, Jul. 2001, http://www.ietf.org/rfc/rfc3095.txt., pp. 1-157.

L-E. Jonsson, et al.. RObust Header Compression (ROHC): Corrections and Clarifications to RFC 3095, Feb. 2007, http://www.ietf.org/rfc/rfc4815.txt., pp. 1-31.

IEEE Computer Society, 802.16 IEEE Standard for Local and Metropolitan Area Networks Part 16: Air Interface for Fixed Broadband Wireless Access Systems, Oct. 2004, http://standards.ieee.org/getieee802/download/802.16-2004.pdf., pp. 1-857.

* cited by examiner

*Primary Examiner* — Huy D Vu
*Assistant Examiner* — Adnan Baig
(74) *Attorney, Agent, or Firm* — Shook, Hardy & Bacon L.L.P.

(57) ABSTRACT

A channel capacity indication, indicating the capacity of a feedback channel and a channel quality indication, indicating the quality of a feedback channel are received. A mode of operation of the header-compression algorithm is selected, based on the received indications. Data is then communicated according to the selected mode of operation of the header-compression algorithm.

19 Claims, 10 Drawing Sheets

| | FEEDBACK CHANNEL RELIABILITY | FEEDBACK CHANNEL CAPACITY | DESIRED OPERATION MODE |
|---|---|---|---|
| 701 | RELIABILITY INDICATION GREATER THAN OR EQUAL TO CHANNEL QUALITY THRESHOLD | CAPACITY INDICATION GREATER THAN OR EQUAL TO CHANNEL CAPACITY THRESHOLD | BIDIRECTIONAL RELIABLE MODE |
| 702 | RELIABILITY INDICATION GREATER THAN OR EQUAL TO CHANNEL QUALITY THRESHOLD | CAPACITY INDICATION LESS THAN CHANNEL CAPACITY THRESHOLD | BIDIRECTIONAL OPTIMISTIC MODE |
| 703 | RELIABILITY INDICATION LESS THAN CHANNEL QUALITY THRESHOLD | CAPACITY INDICATION GREATER THAN OR EQUAL TO CHANNEL CAPACITY THRESHOLD | UNIDIRECTIONAL MODE |
| 704 | RELIABILITY INDICATION LESS THAN CHANNEL QUALITY THRESHOLD | CAPACITY INDICATION LESS THAN CHANNEL CAPACITY THRESHOLD | UNIDIRECTIONAL MODE |

*FIG. 7.*

COMMUNICATING DATA IN VARIOUS MODES USING HEADER-COMPRESSION ALGORITHMS

INTRODUCTION

Applications that typically send small packets use the limited bandwidth available in wireless communication channels inefficiently. This is due to the fact that overhead, in terms of packet headers attached to the data by the protocols used to send the data through the network, remain roughly constant with respect to data size. Therefore, the smaller the amount of data, the larger proportion of the total packet size the header information.

To help alleviate this inefficiency, header-compression algorithms can be used to reduce the size of the headers. Such algorithms typically have a number of modes of operation that affect their use and reliance on feedback channels. However, due to changing wireless-channel conditions (e.g., channel quality and channel capacity), the optimal choice of operational mode changes over time. Therefore, static operational-mode choices have the potential to perform poorly due to these changing wireless conditions.

SUMMARY

Embodiments of the invention are defined by the claims below, not this summary. A high-level overview of various aspects of the invention is provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

Embodiments of the present invention relate to receiving indications indicating the quality and capacity of a wireless feedback channel and using those indications to select a mode of operation for a header-compression algorithm used to compress the headers of packets before transmission. The packets are then transmitted and the receiver decompresses the header using context information sent by the transmitter in addition to the packets with compressed headers.

BRIEF DESCRIPTION OF THE DRAWINGS

Illustrative embodiments of the present invention are described in detail below with reference to the attached drawing figures, which are incorporated by reference herein and wherein:

FIG. 7 is a table depicting an exemplary set of rules for selecting a mode of operation of a header-compression algorithm;

DETAILED DESCRIPTION

Figure 1:
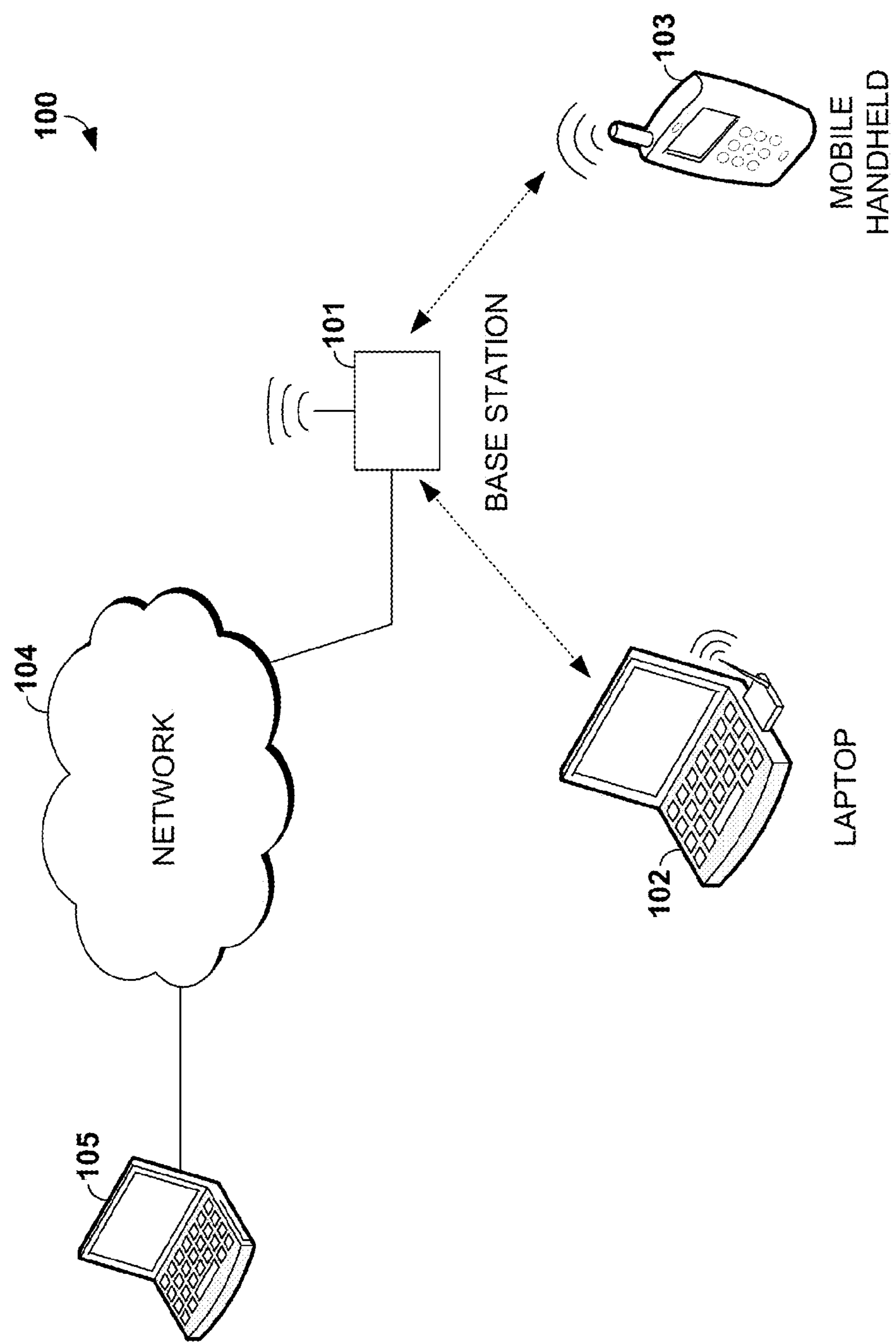
FIG. 1 depicts an exemplary network environment suitable for use in implementing an embodiment of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to a method of communicating over a channel utilizing a header-compression algorithm. The header-compression algorithm is used to reduce the overhead data sent per packet, increasing the overall efficiency of the channel.

In accordance with some embodiments of the present invention, mobile communications devices communicate through a base station that is connected to a wired network. Such communication is typically packet-based. Each packet includes a data section and a header section. The data section contains the actual information that is being communicated by the mobile device in one embodiment. The header section contains information needed to route the packet to its destination successfully. Typically, the header section of the packet is a fixed size, and does not depend on the size of the data to be sent. Wireless communication channels are typically constrained resources; therefore, efficient use of the wireless channel is critical.

However, if the ratio of header to data becomes too large (i.e., if there is little data to send per packet), then the wireless communication channel will be used inefficiently. Such inefficient use can cause poor performance in terms of bandwidth and latency for all users of the wireless system. One way to more efficiently make use of the wireless channel in the face of mobile communications devices needing to send small packets of data (e.g., for voice communication) is to use a header-compression algorithm. Header-compression algorithms, described in detail below, make use of redundancy across headers to reduce the amount of space each header takes up in a packet.

But wireless communications channels are characterized by rapidly changing characteristics, such as signal-to-noise ratio, that can affect the optimal operating mode of various header-compression algorithms. Therefore, according to an embodiment of the invention, a mechanism is used to change the mode of operation of the header-compression algorithm to optimally use the wireless channel.

Accordingly, one embodiment of the invention is directed to computer-readable storage media embodying computer-executable instructions for performing a method of communicating data by way of a sending channel, which is associated with a feedback channel. This communicating involves utilizing a header-compression algorithm that can operate in one of at least three modes. The method includes receiving a capacity indication that indicates the capacity of the feedback channel and receiving a channel quality indication that indicates the quality of the feedback channel. The method then selects one of the at least three modes of operation of the header-compression algorithm based on the two received indications and communicates the data in accordance with the selected mode.

In another embodiment of the invention, an aspect is directed toward a computer-implemented method for communicating a flow of data by way of a sending channel that is associated with a feedback channel. This communicating involves the use of a header-compression algorithm that can operate in a plurality of modes. The method of communicating includes receiving a capacity indication, indicating the capacity of the feedback channel, and receiving a quality indication, indicating the quality of the feedback channel. The method further includes selecting one of the plurality of modes of operation for the header-compression algorithm based on the received indications and communicating a first portion of the data in accordance with the selected mode of operation. The method further includes receiving a new capacity indication and a new quality indication. Then, on the basis of these new indications, selecting a new mode of operation for the header-compression algorithm and communicating a second portion of the flow of data in accordance with the new mode of operation.

A further embodiment of the invention is directed toward computer-readable media storing computer-executable instructions for performing a method of communicating data by way of a sending channel associated with a feedback channel. The communicating involves the use of a header-compression algorithm. The method of communicating includes receiving a capacity indication, indicating the channel capacity based on one or more of the following: idle channel time, the number of free transmission slots, the amount of free buffer space, and the buffer delay. The method of communicating also includes receiving a quality indication, indicating the quality of the channel based on one or more of the following: the signal-to-noise ratio, the interference level, the packet-error rate, the packet-loss rate, and the bit-error rate. Then based on the two received indications, a mode of operating of the header-compression algorithm is selected, where the header-compression algorithm is compatible with IETF RFC 3095 (used hereinafter to refer to the IETF RFC 3095, entitled "Robust Header Compression (ROHC): Framework and four profiles: RTP, UDP, ESP, and uncompressed" available at ietf.org/rfc/rfc3095.txt and included in an accompanying IDS). or a variation thereof, and communicating the data in accordance with the selected operational mode.

One embodiment of our technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as environment 100. In this environment 100, a wireless network is controlled by a base station 101. Base stations 101 make use of wireless communication technologies. According to one embodiment of the invention, the wireless technology is compatible with IEEE 802.16 (used hereinafter to refer to the IEEE 802.16 standard, entitled "802.16 IEEE Standard for Local and Metropolitan Area Networks Part 16: Air Interface for Fixed Broadband Wireless Access Systems" available at standards-.ieee.org/getieee802/download/802.16-2004.pdf and included in an accompanying IDS). According to another embodiment of the invention, the wireless technology is IEEE 802.11 compatible. Members of the network, sharing the wireless channel (e.g., a laptop 102 and a mobile handheld 103). Other exemplary devices that could share the wireless base station include desktop computers equipped with wireless cards, other wireless base stations, printers, music playing devices, cellular phones, and home entertainment devices. Each device sharing the wireless channel has data to send and receive via a network interface card. According to an embodiment of the invention, the base station 101 is connected to a network 104 via a wired link. Those skilled in the art would recognize that other types of links could be used as the link from the base station to the network, such as other wireless technologies. Through this connection, each device sharing the wireless channel can communicate with other devices 105 attached to the network 104.

Figure 2:
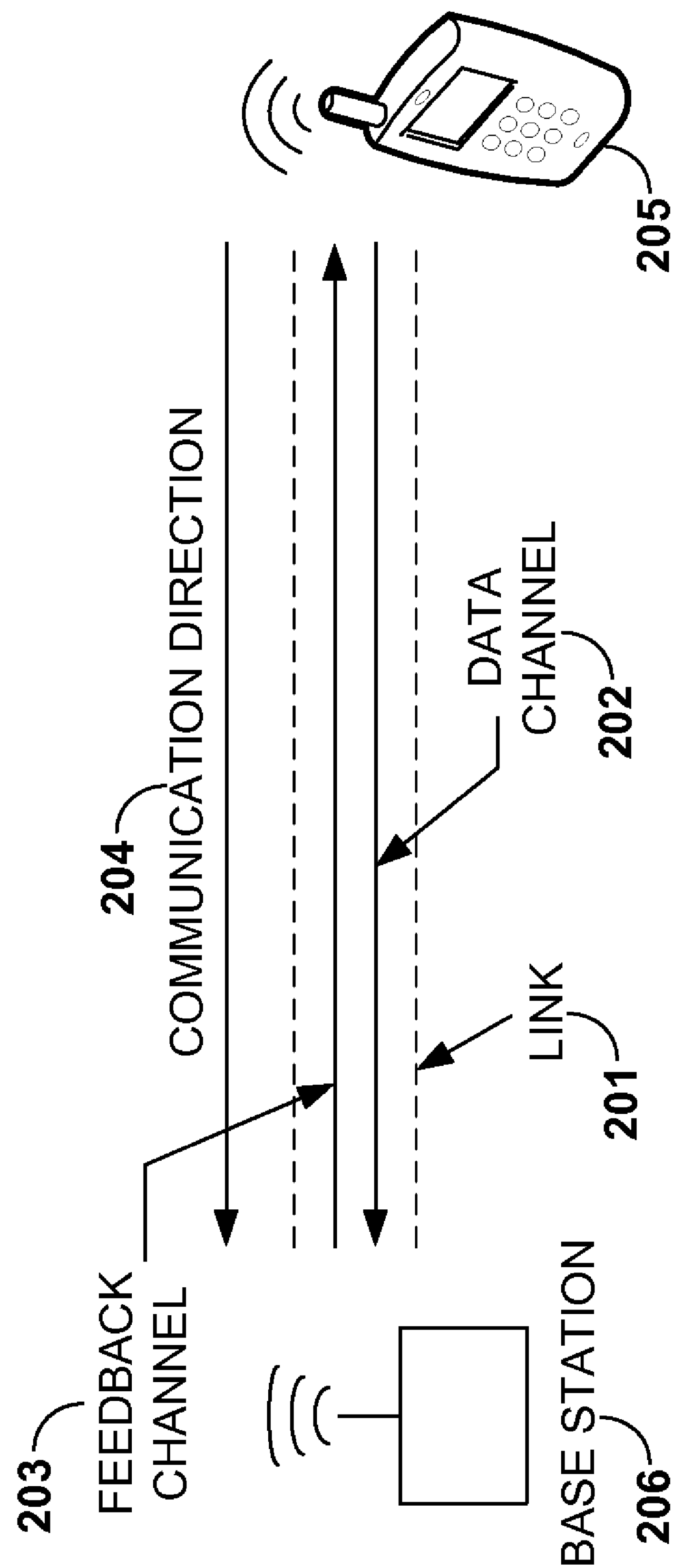
FIG. 2 depicts a wireless link between a base station and a wireless node in accordance with an embodiment of the present invention.

Referring now to FIG. 2, according to some embodiments of the invention, the wireless link 201 is made up of at least two channels, a data channel 202 and a feedback channel 203. The direction of the data channel 202 and the feedback channel 203 are relative to the overall communication direction 204. By way of illustration, in FIG. 2, the communication direction 204 is from the mobile handheld device 205 to the base station 206. Therefore, the data channel 202 follows the communication direction 204 and is from the mobile handheld device 205 to the base station 206, while the feedback channel 203 is in the opposite direction, leading from the base station 206 to the mobile handheld device 205. In wireless environments, it is common for the characteristics of the data channel 202 and the feedback channel 203 to be different. By way of example, for IEEE 802.16 compatible wireless networks, the capacity of the feedback channel 203 is typically less than that of the data channel 202. Additionally, the channel quality of the data channel 202 could be different than that of the feedback channel 203.

The capacity of a wireless channel can be measured by many different metrics. By way of illustration, one such metric is the amount of idle channel time that exists. This is the amount of time that a wireless channel has no communication on it during a given span of time. Another common metric is the number of free transmission slots available in any round of communication. Many wireless technologies use a channel sharing mechanism wherein segments of time are divided into slots and each slot is assigned to a wireless communication device. The number of free slots available for wireless communication devices is also an indication of remaining capacity. Base stations 206 typical have buffer space to store packets that need to be sent. As a wireless channel becomes used to its capacity, these buffers tend to accumulate packets. The measure of the number of packets in a buffer or the free space left in a buffer is a measure of remaining capacity. A related metric is buffer delay, which measures the average amount of time a packet will stay in a buffer of base station 206. As more packets are sent over the shared wireless channel, more packets build up in the base station's 206 buffer, leading to longer buffer delays.

The quality of a wireless channel can be measured by many different metrics. By way of example, one such metric is defined by the signal level compared to the noise level in the air at the site of the receiving node (called the signal-to-noise ratio), which is predictive of the amount of error that will be encountered in a communication channel. Another metric is the channel-interference level, which is a measure of the signal that is not due to the sender in the air at the site of the receiving node and also is predictive of the amount of error that will be encountered in a communication channel. Packet-error rate is a measure of the number of packets that are received in error over a time interval at the receiver. Packet-error rate is a direct measure of the quality of a communication channel. Bit-error rate is a measure of the number of bits that are received in error over a time interval and is also a direct measure of the quality of a communication channel. One skilled in the art will recognize that there are other metrics that could be used to measure either the channel capacity or the channel quality of a wireless channel.

Figure 3:
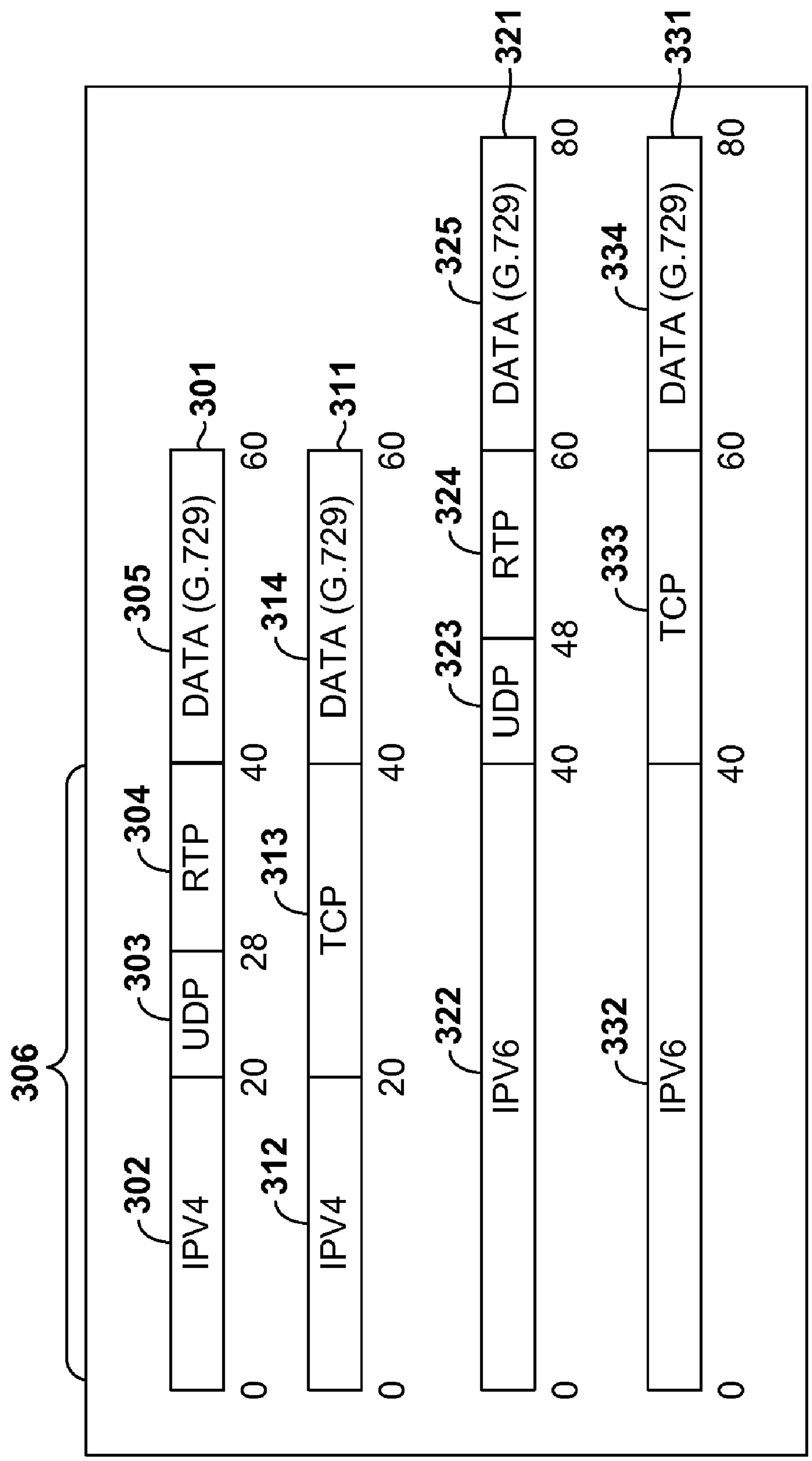
FIG. 3 is a packet diagram depicting the structure of common headers in accordance with an embodiment of the present invention.

Turning now to FIG. 3, by way of illustration, four potential packet formats are presented to further illustrate the concept of packet overhead. Packets are divided into two basic sections, a header section 306 and a data section 305, 314, 325, 334. The contents of the data section are defined by the applications on the mobile device that need to send data. Consider a voice data application using a standard encoder (examples include G.729 and Speex). G.729 segments are commonly twenty bytes long. The contents of the header section 306 are defined by the specific protocols used to transfer data. Some common combinations of protocols used when transmitting voice data are shown in FIG. 3; however, one skilled in the art will recognize that there are many other possibilities. The protocol combination used in the first packet 301 makes use of IPv4 (Internet Protocol version 4) 302 for routing information and UDP (User Datagram Protocol) 303 and RTP (Real Time Protocol) 304 for transport layer information.

The overhead for this first example packet is then the size of all the headers added together or forty bytes by the total packet size or 60 bytes, which means that the packet is two-thirds overhead. Sending such packets leads to inefficient use of the wireless channel. The protocol combination in the second packet 311 makes use of IPv4 312 for routing information and TCP (Transmission Control Protocol) 313 for transport layer information. Again, for this protocol combination, the packet consists of two-thirds overhead. The protocol combination in the third packet 321 makes use of IPv6 (Internet Protocol version 6) 322 for routing information. This new version of IP requires two times the overhead space of the old version. For transport layer information, UDP 323 and RTP 324 are used. In this case the overhead makes up three-fourths of the total packet size. The fourth protocol combination 331 uses IPv6 332 for routing information and TCP 333 for transport layer information. Again, overhead makes up three-fourths of the packet. Using these or similar protocol combinations with similarly small data results in inefficient use of wireless channels.

Figure 4:
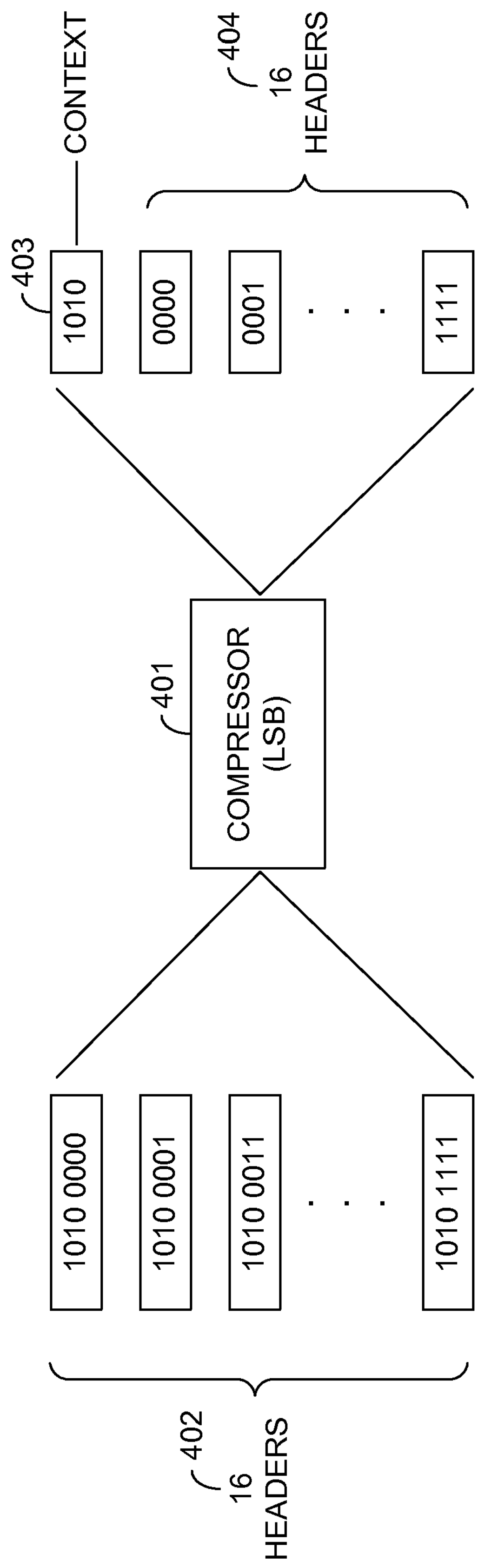
FIG. 4 is a block diagram of an exemplary header compressor in accordance with an embodiment of the present invention.

Turning now to FIG. 4, in accordance with some embodiments of the invention, header-compression algorithms work to reduce the size of the headers sent per data packet, thus increasing the efficiency with which the shared wireless channel is used. One skilled in the art will recognize that there are many algorithms by which the headers of packets can be compressed. By way of example and not limitation, a Least Significant Bit (LSB) compressor 401 takes as input a number of headers 402 and outputs a number of compressed headers plus some context information 403. It is recognized that many of the bits in each header do not change often between packets. The headers 402 in the example have the left-most four bits in common. Therefore, the LSB compressor creates a context packet 403 made up of those four bits. The compressor 401 then outputs the context packet 403 and the remaining four bits of each header 404.

Figure 5:
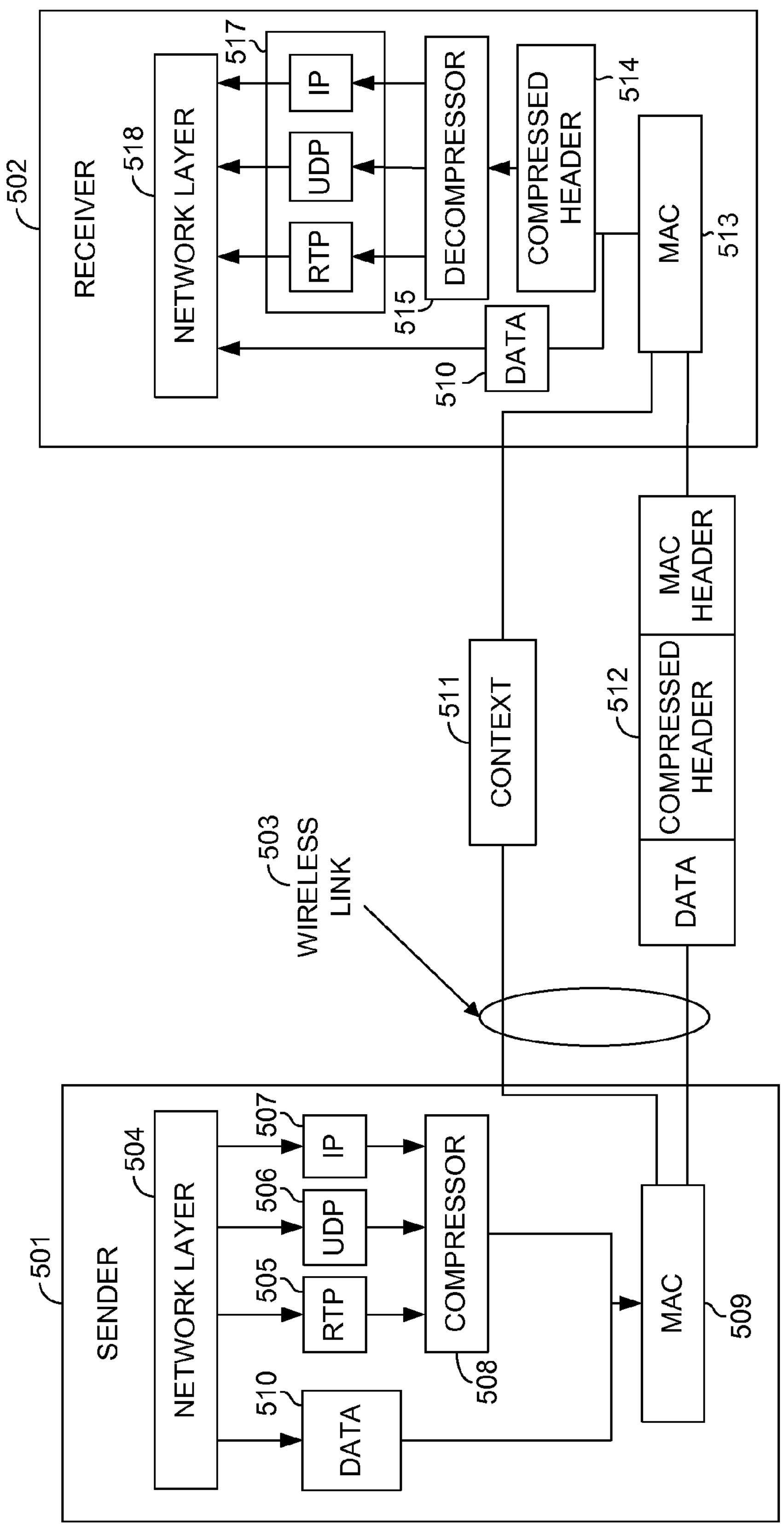
FIG. 5 is a block diagram of a sender and receiver using a header-compression algorithm for communication.

Turning now to FIG. 5, the compressor of FIG. 4 is only one part of a header-compression algorithm for use in a communications system. According to some embodiments of the invention, a sender 501 is connected via a wireless link 503 to a receiver 502. The sender contains a network layer 504 that creates headers for the various protocols used 505, 506, 507. The network layer 504 passes the protocol headers 505, 506, 507 to the compressor 508, which outputs a context packet 511 and the compressed header 512. The data 510 and the compressed header 512 are combined to create a packet and, along with the context packet 511 are passed to the MAC (medium access control) layer 509 to be sent. The MAC layer 509 sends both the context data 511 and the data packet containing the compressed header 512 along the wireless link 503. Upon receiving the packets, the MAC layer at the receiver 513 passes the compressed header 514 to the de-compressor 515, which uses the context 511 to de-compress the header. The data 510 and the de-compressed header 517 are passed to the network layer 518 for processing.

Figure 6:
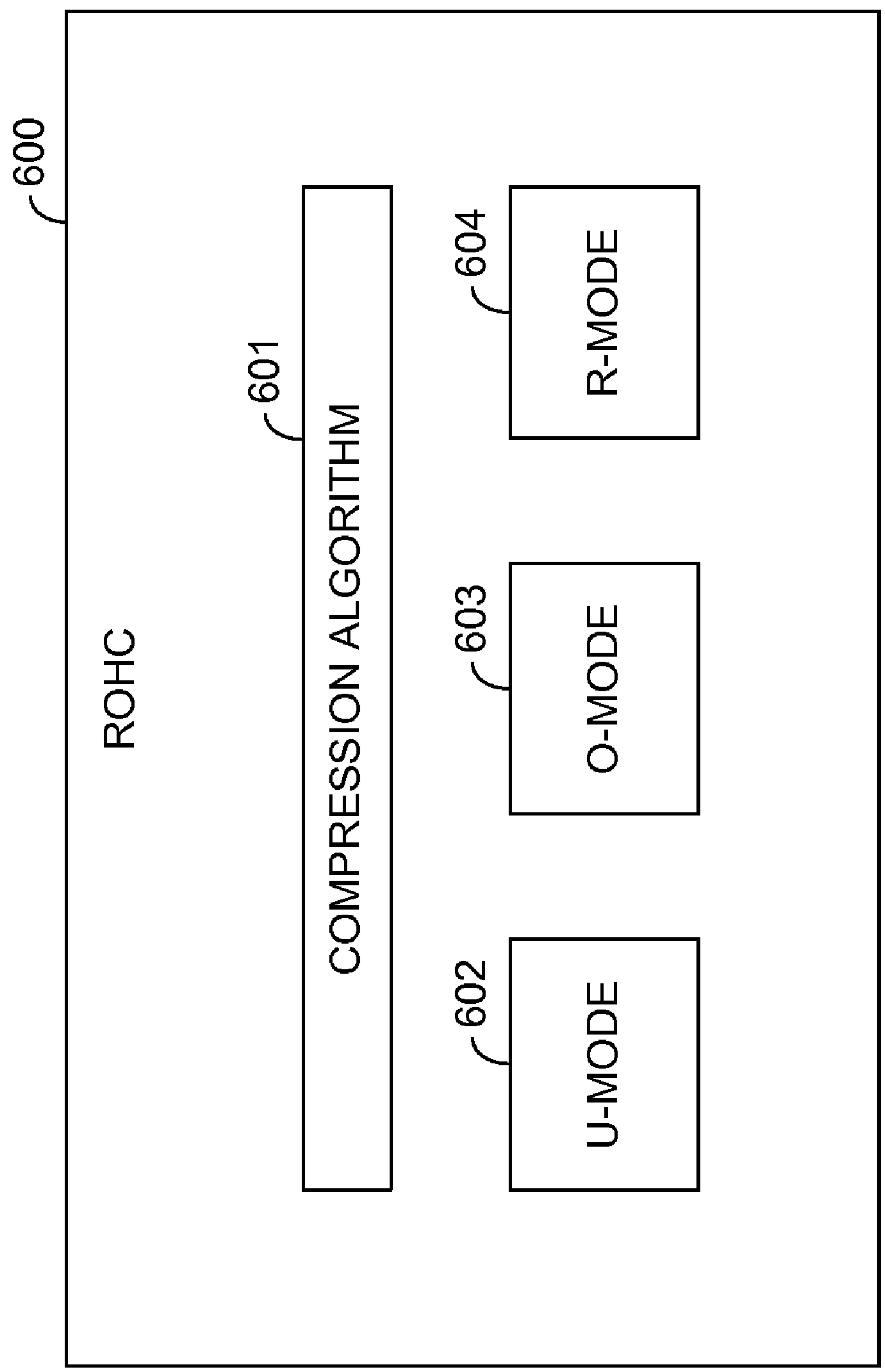
FIG. 6 is a block diagram of an exemplary header-compression algorithm in accordance with an embodiment of the present invention.

Header compressors, such as the LSB compressor, perform best when the same context packet can be used for many data packets. However, decisions must be made as to how often and exactly when new context packets should be made and sent. Additionally, the existence, frequency, and role of feedback from the receiver must be decided. Such decisions define modes of operation of the header-compression algorithm and can affect the overall performance of said header-compression algorithm. For illustrative purposes, consider the Robust Header-compression algorithm defined by IETF RFC 3095. Referring now to FIG. 6, the header-compression algorithm 601 has three modes of operation, dictating the amount of feedback from the receiver needed and frequency of the context packet creation. The first mode, U-Mode 602, is called Unidirectional Mode and sends packets only along the data channel. No feedback is used. The second mode, O-Mode 603 is called Bidirectional Mode and uses the feedback channel to send error recovery requests and acknowledgments of significant context updates. The third mode, R-Mode 604, is called Bidirectional Reliable Mode and makes much larger use of the feedback channel.

According to some embodiments of the present invention, the operational efficiency of the header-compression algorithm in each mode can be predicted by the capacity and the quality of the feedback channel. Robust Header Compression is again used to illustrate; however, one skilled in the art would recognize that other header-compression algorithms' efficiencies depend on the capacity and quality of the feedback channel and could therefore be used to embody the invention. Turning to FIG. 7, the selection of the mode of operation for Robust Header Compression depends on the capacity and the quality of the feedback channel. According to an embodiment of the present invention, two thresholds are defined: a channel quality threshold and a channel capacity threshold. These thresholds are compared to indications of current channel conditions. A quality indication indicates the channel quality. Such an indication can be based on a number of characteristics as discussed previously. A capacity indication indicates the channel capacity and can be based on a number of characteristics as discussed previously.

According to an embodiment of the invention, the rows in FIG. 7 define characteristics for deciding in which mode to operate Robust Header Compression. Row 701 of the table shows that, if the quality indication is greater than or equal to the channel quality threshold and the channel capacity indication is greater than or equal to the channel capacity threshold, then the bidirectional reliable mode is used. Row 702 of the table shows that if the quality indication is greater than or equal to the channel quality threshold and the capacity indication is less than the channel capacity threshold, then the bidirectional optimistic mode is used. Row 703 shows that if the quality indication is less than the channel quality threshold and the capacity indication is greater than or equal to the channel capacity threshold, then the Unidirectional Mode is used. Row 704 shows that if the quality indication is less than the channel quality threshold and the capacity indication is less than the channel capacity threshold, then the Unidirectional Mode is used.

Other formulations using relational operators such as greater than, less than, and less than or equal to, are also possible. Additionally, other header-compression algorithms with different modes whose optimality are affected by channel capacity and channel quality could be used in other embodiments of the invention.

Figure 8:
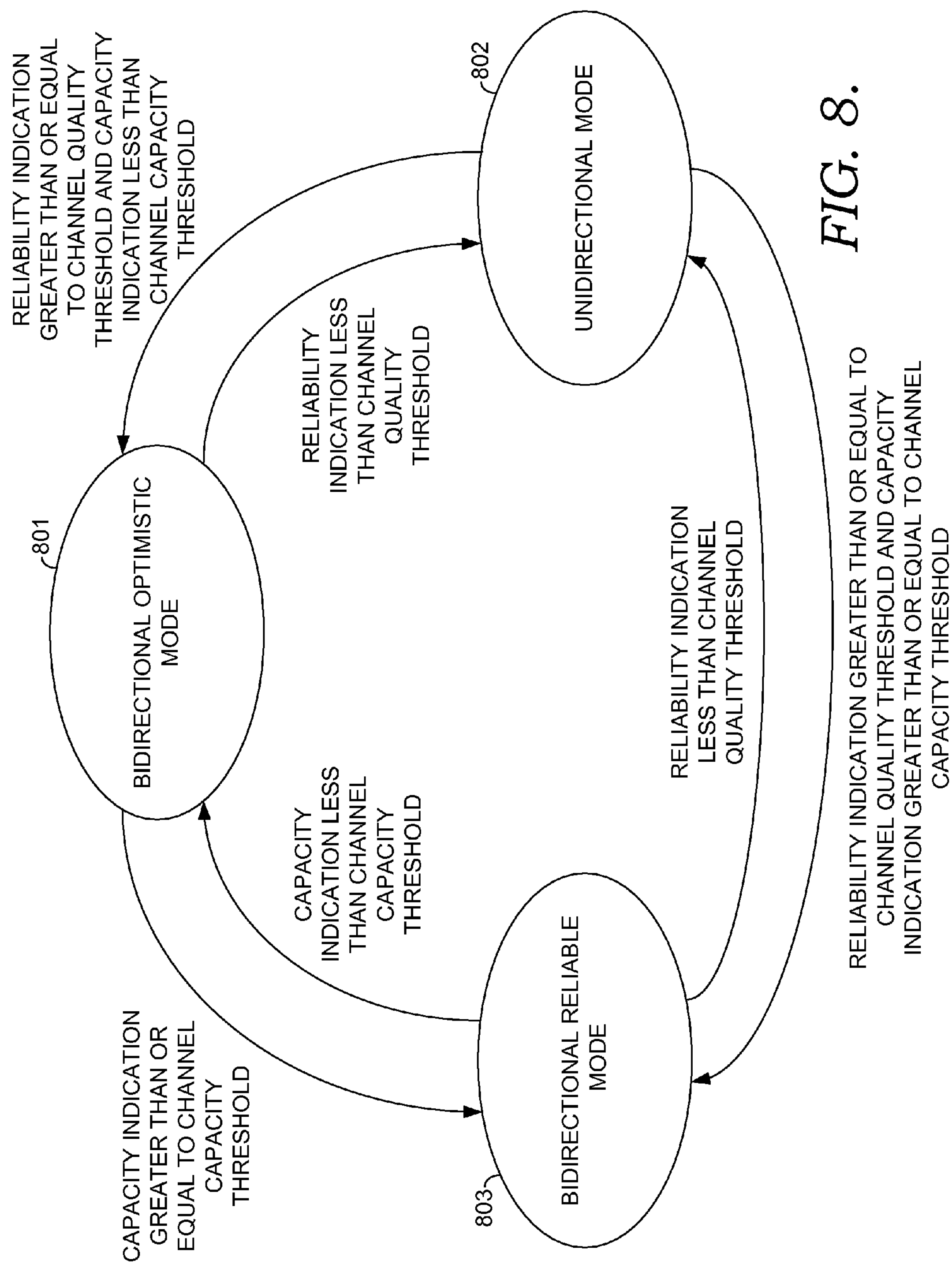
FIG. 8 is a state transition diagram showing the state transitions of a header-compression algorithm based on capacity indications and channel quality indications in accordance with an embodiment of the present invention.

The table in FIG. 7 can be used to define a state transition diagram, depicted in FIG. 8, for the operation of the header-compression algorithm according to an embodiment of the present invention. When the algorithm is operating in Bidirectional Optimistic Mode 801 and the quality indication is less than the channel quality threshold, then the mode is changed to Unidirectional Mode 802. When the algorithm is operating in Bidirectional Optimistic Mode 801 and the capacity indication is greater than or equal to the channel capacity threshold, then the mode is changed to Bidirectional Reliable Mode 803. When the algorithm is operating in Bidirectional Reliable Mode 803 and the quality indication is less than the channel quality threshold, then the mode is changed to Unidirectional Mode 802. When the algorithm is operating in Bidirectional Reliable Mode 803 and the capacity indication is less than the channel capacity threshold, then the mode is changed to Bidirectional Optimistic Mode 801.

When the algorithm is operating in Unidirectional Mode 802 and the quality indication is greater than or equal to the channel quality threshold and the capacity indication is less than the channel capacity threshold, then the mode is changed to Bidirectional Optimistic Mode 801. When the algorithm is in Unidirectional Mode 802 and the quality indication is greater than or equal to the channel quality threshold and the capacity indication is greater than or equal to the channel capacity threshold, then the mode is changed to Bidirectional Reliable Mode 803. Those skilled in the art would recognize that state transitions could be described using other combinations of relational operators such as less than or equal to and greater than. Additionally, other header-compression algorithms with different modes whose optimality are affected by channel capacity and channel quality could be used in other embodiments of the invention.

Figure 9:
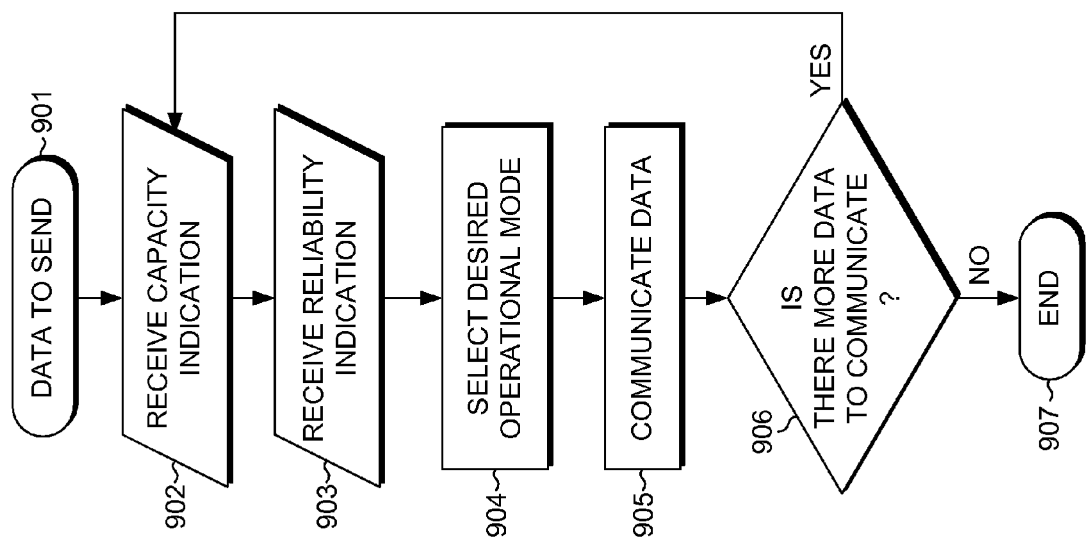
FIG. 9 is a flow diagram showing a method for selecting a mode of operation of a header-compression algorithm in accordance with an embodiment of the present invention.

According to an embodiment of the invention, FIG. 9 presents a flow chart of the header-compression algorithm. Upon receiving data to send, as shown in block 901, the sender waits to receive a capacity indication, shown in block 902, indicating the capacity of the feedback channel from the receiver to the sender. After receiving the capacity indication, shown in block 902, the sender waits to receive a quality indication, shown in block 903, indicating a channel quality of the feedback channel from the receiver to the sender. One skilled in the art will recognize that these two indications could arrive in any order. After receiving both indications, a desired mode of operation for the header-compression algorithm is selected, shown in block 904, according to a table similar to the example in FIG. 7. Once a desired mode of operation is selected, the data is communicated, as shown in block 905, using the desired mode. According to some embodiments of the invention, once the data is communicated, shown in block 905, there could be more data to be sent to the receiver, shown in block 906. If there is, then a new capacity indication is received, shown in block 902, and the process is started over. Otherwise, the algorithm terminates, as shown in block 907.

Figure 10:
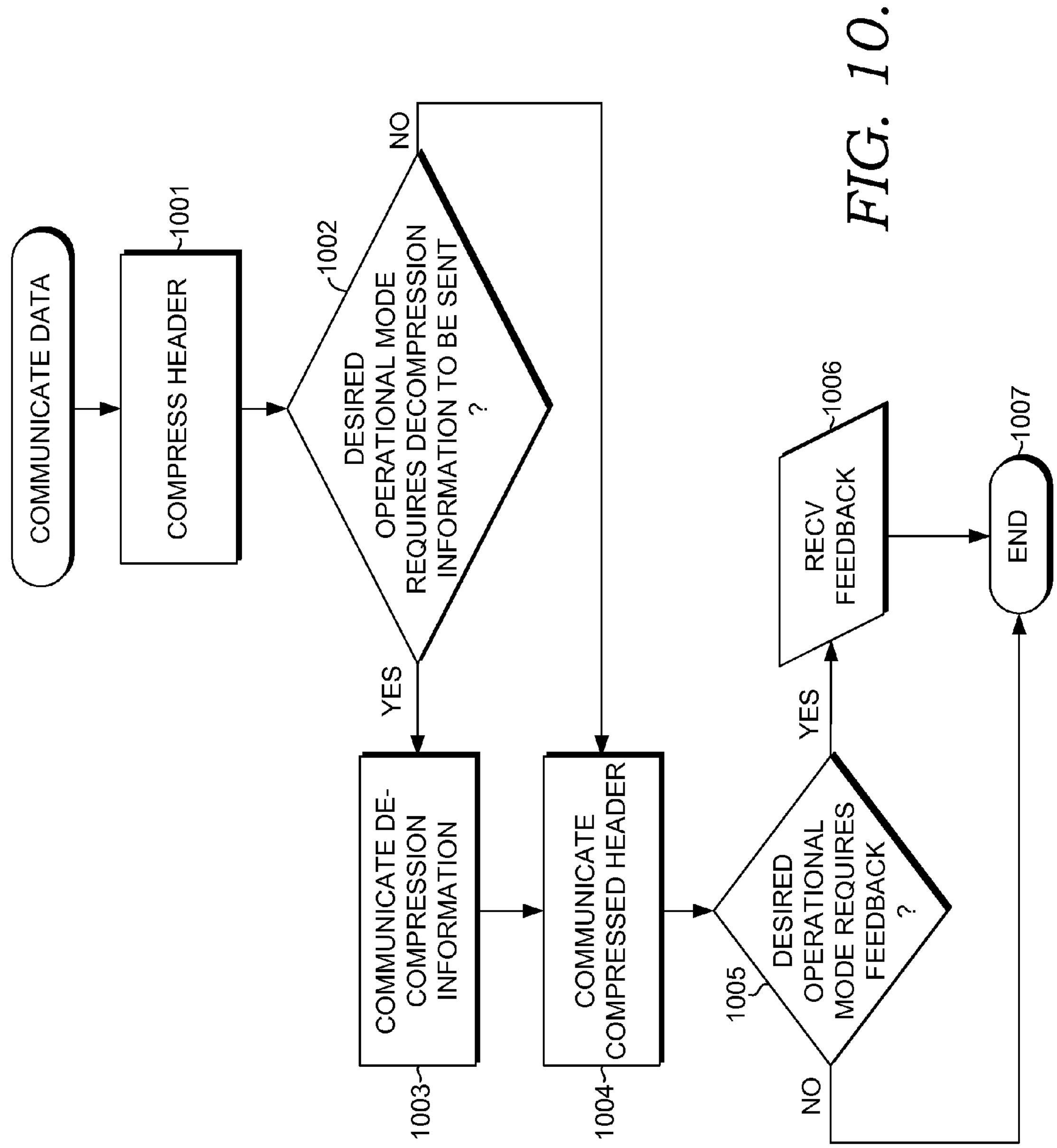
FIG. 10 is a flow diagram showing a method of communicating data according to a mode of operation of a header-compression algorithm in accordance with an embodiment of the present invention.

The communication of data, as shown in block 905, is expanded, according to an embodiment of the invention in FIG. 10. The first step in communicating data is the compression of the header associated with the packet of data, shown in block 1001. Once the header is compressed, context, which is decompression information, may need to be sent depending on the desired operational mode. If decompression information is required to be sent, as shown in block 1002, then it is communicated, shown in block 1003, and the algorithm continues to communicate the compressed header along with the data, shown in block 1004. If the decompression information is not required, shown in block 1002, then the algorithm jumps to communicating the compressed header and data, shown in block 1004. Once the compressed header and data have been sent, some desired operational modes require feedback along the feedback channel, shown in block 1005. If feedback is required, then the sender waits to receive the feedback, shown in block 1006, and alters the state of the header-compression algorithm accordingly and terminates, shown in block 1007. If no feedback is required, then the algorithm terminates directly, shown in block 1007.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media storing computer-executable instructions for performing a method of communicating data by way of a sending channel that is associated with a feedback channel, where communicating involves utilizing a header-compression algorithm that can operate in one of at least three modes, the method comprising:

receiving a capacity indication that indicates a capacity of the feedback channel;

receiving a quality indication that indicates a communications quality of the feedback channel;

based on said capacity indication and on said quality indication, selecting one of said at least three modes, resulting in a selection of a desired operational mode of said header-compression algorithm, wherein selecting one of at least three modes includes:

(1) comparing the capacity indication to a predetermined channel capacity threshold;

(2) comparing the quality indication to a predetermined channel quality threshold;

(3) if the quality indication is less than the predetermined channel quality threshold, select the unidirectional mode as the desired operational mode;

(4) if the quality indication is greater than or equal to the predetermined channel quality threshold and the capacity indication is less than the channel capacity threshold, select the bidirectional optimistic mode as the desired operational mode; and (5) if the quality indication is greater than or equal to the predetermined channel quality threshold and the capacity indication is greater than or equal to the channel capacity threshold, select the bidirectional reliable mode as the desired operational mode; and communicating said data in accordance with said desired operational mode.

2. The media of claim 1, wherein the feedback channel comprises a wireless link.

3. The media of claim 2, wherein the wireless link complies with IEEE 802.16 or a variation thereof.

4. The media of claim 2 wherein the feedback channel is a unidirectional channel directed from a receiver to a sender.

5. The media of claim 1, wherein the capacity indication is based on one or more of the following: an idle channel time, a number of free transmission slots, an amount of free buffer space, and a buffer delay.

6. The media of claim 1, wherein the quality indication is based on one or more of the following: a signal-to-noise ratio, a channel-interference level, a packet-error rate, a packet-loss rate, and a bit-error rate.

7. The media of claim 1, wherein the header-compression algorithm complies with IETF RFC 3095 or a variation thereof.

8. The media of claim 7, wherein the at least three modes comprise:

a unidirectional mode;

a bidirectional optimistic mode; and a bidirectional reliable mode.

9. The media of claim 1, wherein said communicating said data comprises:

compressing a header of the data, resulting in a compressed header;

sending a decompression information communication according to the desired operational mode;

sending the compressed header and the data; and waiting for a feedback communication according to the desired operational mode.

10. The media of claim 9, wherein the decompression information communication includes information needed to uncompress said header of said data.

11. The media of claim 9, wherein said feedback communication includes one or more of the following: an acknowledgement, a negative acknowledgement, a selective acknowledgement, and a cumulative acknowledgement.

12. One or more non-transitory computer-readable media storing computer-executable instructions for performing a method of communicating a flow of data by way of a sending channel that is associated with a feedback channel, where communicating involves utilizing a header-compression algorithm that can operate in a plurality of modes, the method comprising:

receiving a capacity indication that indicates a capacity of the feedback channel;

receiving a quality indication that indicates a communications quality of the feedback channel;

comparing the capacity indication to a predetermined channel capacity threshold;

comparing the quality indication to a predetermined channel quality threshold;

if the quality indication is less than the predetermined channel quality threshold, select the unidirectional mode as a desired operational mode;

if the quality indication is greater than or equal to the predetermined channel quality threshold and the capacity indication is less than the channel capacity threshold, select the bidirectional optimistic mode as the desired operational mode; and if the quality indication is greater than or equal to the predetermined channel quality threshold and the capacity indication is greater than or equal to the channel capacity threshold, select the bidirectional reliable mode as the desired operational mode;

communicating a first portion of the flow of data in accordance with said desired operational mode; and receiving a new capacity indication that indicates a capacity of the feedback channel;

receiving a new quality indication that indicates a communications quality of said feedback channel;

based on said new capacity indication and on said new quality indication, selecting one of the plurality of modes, resulting in a selection of a new desired operational mode of said header-compression algorithm; and communicating the second portion of the flow of data in accordance with said new desired operational mode.

13. The media of claim 12, wherein the flow of data comprises two or more segments of a totality of data to be communicated by way of the sending channel.

14. The media of claim 13, wherein the first portion of the flow of data comprises at least one segment of the totality of data to be communicated by way of the sending channel, but less than the total number of segments of the totality of data to be communicated by way of the sending channel.

15. The media of claim 14, wherein the second portion of the flow of data comprises at least one segment of the totality of data to be communicated by way of the sending channel, but less than the total number of segments of the totality of data to be communicated by way of the sending channel.

16. The media of claim 15, wherein a size of the first portion of the flow of data to be communicated by way of the sending channel is determined by one of a plurality of predetermined parameters including the following: a total size of the first portion of the flow of data, a total transmission time for the first portion of the flow of data, and a total number of individual segments for the first portion of the flow of data.

17. The media of claim 15, wherein a size of the second portion of the flow of data to be communicated by way of the sending channel is determined by one of a plurality of predetermined parameters including the following: a total size of the second portion of the flow of data, a total transmission time for the second portion of the flow of data, and a total number of individual segments for the second portion of data.

18. One or more non-transitory computer-readable media storing computer-executable instructions for performing a method of communicating data by way of a sending channel that is associated with a feedback channel, where communicating involves utilizing a header-compression algorithm that can operate in one of at least three modes, the method comprising:

receiving a capacity indication that indicates a capacity of the feedback channel, wherein said capacity indication is based on one or more of an idle channel time, a number of free transmission slots, an amount of free buffer space, and a buffer delay;

receiving a quality indication that indicates a communications quality of the feedback channel, wherein said quality indication is based on one or more of a signal-to-noise ratio, a channel-interference level, a packet-error rate, a packet-loss rate, and a bit-error rate;

based on said capacity indication and on said quality indication, selecting one of said at least three modes, the at least three modes comprising a unidirectional mode, a bidirectional optimistic mode, and a bidirectional reliable mode, resulting in a selection of a desired operational mode of said header-compression algorithm, wherein said header-compression algorithm complies with IETF RFC 3095 or a variation thereof, wherein selecting one of at least three modes includes:

(1) comparing the capacity indication to a predetermined channel capacity threshold;

(2) comparing the quality indication to a predetermined channel quality threshold;

(3) if the quality indication is less than the predetermined channel quality threshold, select the unidirectional mode as the desired operational mode;

(4) if the quality indication is greater than or equal to the predetermined channel quality threshold and the capacity indication is less than the channel capacity threshold, select the bidirectional optimistic mode as the desired operational mode; and (5) if the quality indication is greater than or equal to the predetermined channel quality threshold and the capacity indication is greater than or equal to the channel capacity threshold, select the bidirectional reliable mode as the desired operational mode; and communicating said data in accordance with said desired operational mode.

19. The media of claim 18, wherein the wireless link complies with IEEE 802.16 or a variation thereof.

* * * * *